Figure 1:
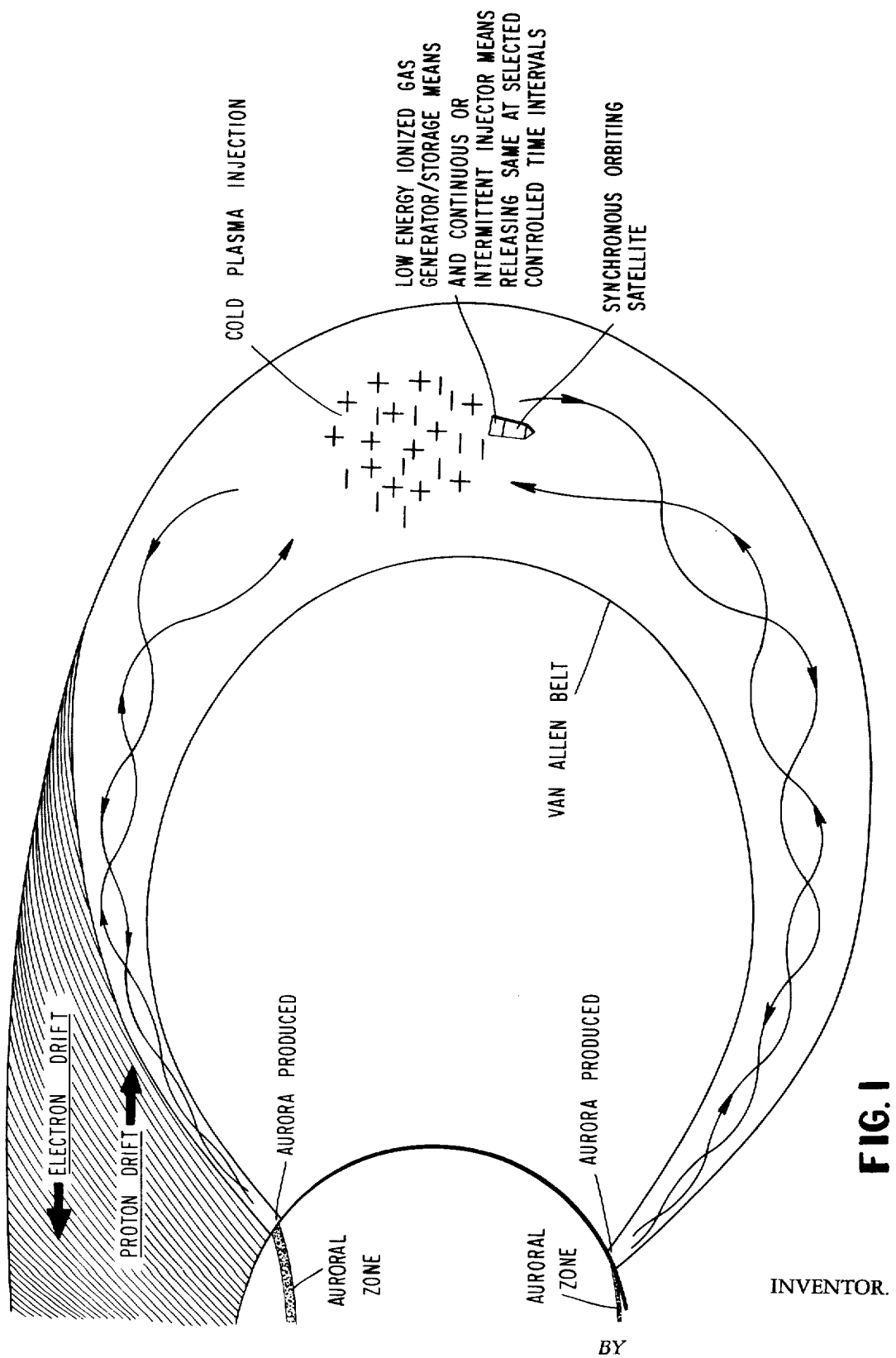

United States Patent [19]

Brice, deceased et al.

[11] 4,035,726

[45] July 12, 1977

[54] METHOD OF CONTROLLING AND/OR IMPROVING HIGH-LATITUDE AND OTHER COMMUNICATIONS OR RADIO WAVE SURVEILLANCE SYSTEMS BY PARTIAL CONTROL OF RADIO WAVE ET AL.

[76] Inventors: Neil M. Brice, deceased, late of King Ferry, N.Y.; Marilyn J. Brice, executrix, R.R. No. 1, King Ferry, N.Y. 13081

[21] Appl. No.: 174,049

[22] Filed: Aug. 23, 1971

Related U.S. Application Data

[63] Continuation-in-part of Ser. No. 173,610, Aug. 20, 1971.

[51] Int. Cl.² .................................... H04G 1/10
[52] U.S. Cl. ........................ 325/65; 343/100 ST
[58] Field of Search ...................... 325/15, 26, 65; 343/100 ST

[56] References Cited

FOREIGN PATENT DOCUMENTS 960,442  6/1964  United Kingdom ............... 325/65

OTHER PUBLICATIONS

E. Dirsa, Telem. & Comm. Problem etc., PIRE, 1960, pp. 703–713.

Primary Examiner—Nelson Muskowitz
Attorney, Agent, or Firm—Jim Zegeer

[57] ABSTRACT

There is disclosed a method of controlling high-latitude communications by cold plasma injection in the distant magnetosphere, and to thereby control the ionospheric and or magnetospheric medium through which the waves are to be propagated.

This application incorporates the substance of the invention disclosed in applicant's application Ser. No. 174,047 filed concurrently herewith and now abandoned.

13 Claims, 2 Drawing Figures

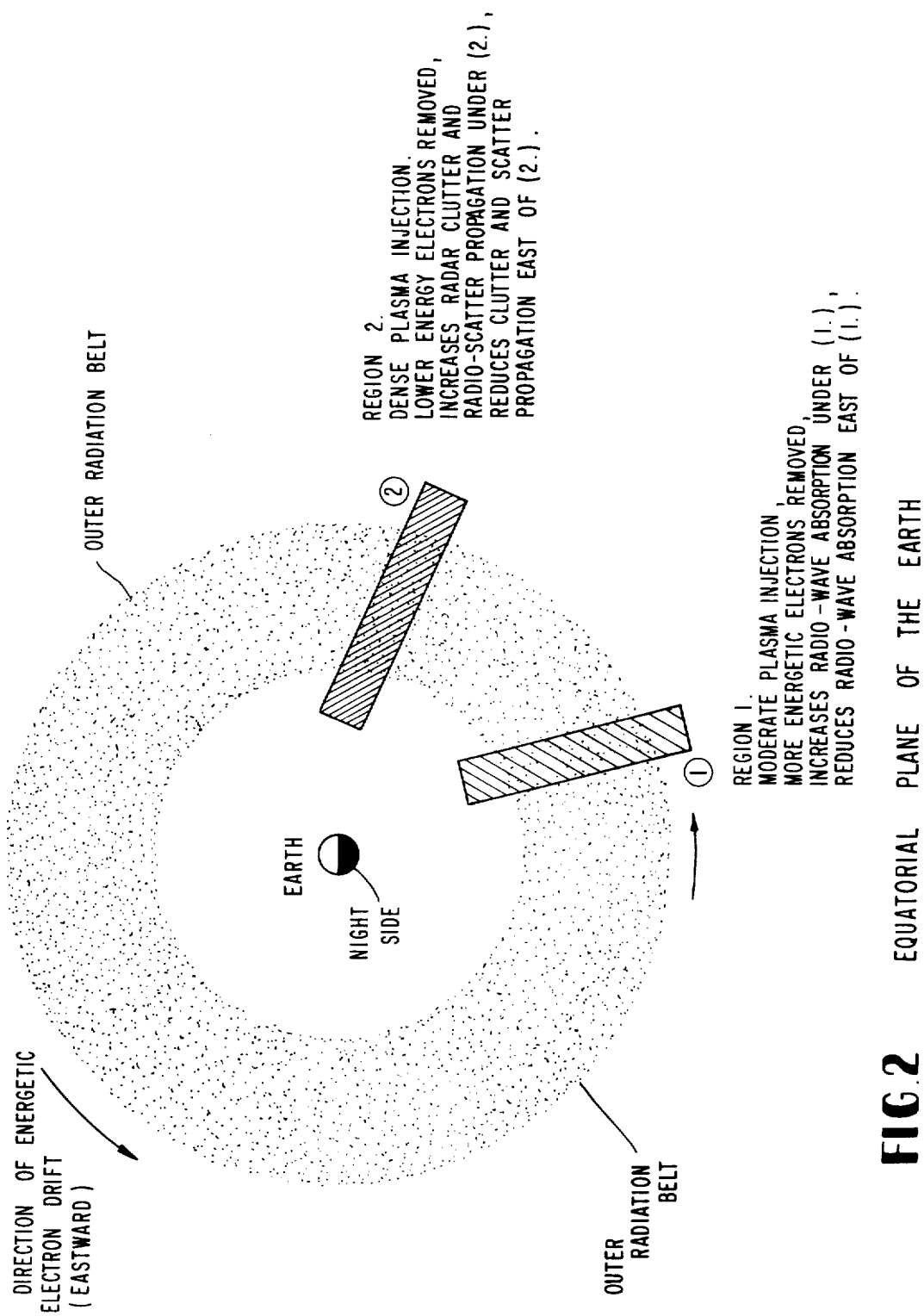
FIG. 2 EQUATORIAL PLANE OF THE EARTH

METHOD OF CONTROLLING AND/OR IMPROVING HIGH-LATITUDE AND OTHER COMMUNICATIONS OR RADIO WAVE SURVEILLANCE SYSTEMS BY PARTIAL CONTROL OF RADIO WAVE ET AL.

This application is a continuation-in-part of my application Ser. No. 173,610 filed Aug. 20, 1971 entitled "Method and Apparatus for Producing a Controlled Change in Earth Characteristics and Measuring Earth Changes" and includes the subject matter of application Ser. No. 174,047, filed Aug. 23, 1971, now abandoned.

Control of energetic charged particles trapped by the earth's magnetic field is achieved by controlled cold plasma (i.e. low energy ionized gas or particle) injection in amounts which, although small, are significantly larger than amounts of low-energy ionized gases which are naturally present, and major control effects can be achieved with the artificial injection.

FIG. 1 of the drawing is an enlarged equatorial section through the earth showing the Van Allen Radiation belt and FIG. 2 is an illustration of the equatorial plane of the earth with explanatory legends.

It is well known that ionized particles have a strong tendency to follow magnetic field lines. In the absence of perturbations with periods comparable with the particle gyration period, the angle between the particle trajectory and the magnetic field, $\alpha$, is governed by the equation $(\sin^2 \alpha/B) =$ constant, where B is the magnetic field strength. Energetic charged particles in the radiation belts are trapped when their "pitch angle", $\alpha$, is sufficiently large at large distances where the magnetic field is weak. They are reflected back away from the earth at a value of the magnetic field for which $\alpha$ becomes 90°. If, $\alpha$ is very small, the particles approach close to the earth, and are lost through collisions with atmospheric constituents before they are reflected. Since particles with small pitch-angles are rapidly removed, there is an inherent anisotropy in the trapped energetic particles with more particles traveling normal (perpendicular) to the magnetic field than parallel to it.

This anisotropy leads to plasma instabilities and amplification of waves propagating in the region of the radiation belts. In the amplification process, the average pitch angle of the particles resonating with the waves is reduced, as the effect of the waves is to randomize the particle pitch angle, and hence remove the anisotropy. The decrease in pitch angle causes some particles which were previously trapped to penetrate down to the atmosphere and be lost. Most of the amplification takes place in and near the equatorial plane where, for a given magnetic field line, the magnetic field strength (and hence particle cyclotron frequency) are smallest. The waves that are amplified also tend to follow the magnetic field lines toward the earth. Some of the wave energy is reflected back into the interaction region and amplified again. If the gain in wave amplitude in the interaction region more than compensates for the reflection loss, the wave amplitude rapidly increases. The amount of wave gain is, however, proportional to the number of energetic particles resonating with the wave, and amplification of waves leads to removal of particles. The very large wave amplitudes produced as described above rapidly reduce the number of trapped energetic particles to the point where the gain in wave energy in the interaction just balances the reflection loss. This provides an upper limit to the number of energetic particles which may be stably trapped.

It is readily shown that there is an upper limit to the electromagnetic wave frequencies which may be amplified ($\omega$ max), given by $$(\omega \, max/\Omega) = (A/A + 1)$$

for energetic electrons, where A is the anisotropy.

The particles which resonate with the wave are those whose velocity causes them to see the wave frequency doppler-shifted to their cyclotron frequency $$\Omega = \omega + k V_{11}$$

where $k$ is the wave number and $V_{11}$ the particle velocity anti-parallel to the wave. There is thus a minimum parallel velocity and corresponding minimum parallel particle energy at which electromagnetic wave growth occurs. Particles with lower energies do not give wave amplification, and hence are not precipitated into the atmosphere by this process. There is thus a threshold energy below which the "stable trapping limit" does not exist and at energies below this threshold very large fluxes of energetic particles can and do exist. The threshold energy depends on the wave number squared, $k^2$, and this is proportional to the plasma frequency squared, which in turn is proportional to the total ionization density, N ("cold" and energetic particles). It may be shown that the threshold particle energy is a few times the magnetic energy per particle, $B^2/2 \mu oN$, where $\mu o$ is the permeability of free space and N is the plasma density. In order to precipitate a substantial fraction of the energetic particles, the mean particle energy ($<E>$) should be comparable with or greater than the threshold energy $E_{th}$, $$<E \sim E_{th} \sim (3 \, to \, 10) \, B^2/2\mu oN)$$

Measurements of energetic particles, magnetic field strength, B, and plasma density, N, in the regions of the radiation belts show (not unexpectedly) that the bulk of the energetic particles energy resides in particles whose energy is below the threshold energy. The plasma densities measured are generally in the range 0.1 to 10 per cm$^3$ in the equatorial plane in the outer radiation belt. The total amount of plasma above 1000 km in a magnetic flux tube which maps down to an area of 1 cm$^2$ at 1000 km (the flux-tube content per cm$^2$) is typically $10^{12}$ to $10^{13}$ with extreme values perhaps a factor of 3 smaller or larger.

ARTIFICIAL MODIFICATION OF THE INSTABILITY AND PRECIPITATION PROCESS

From these numbers, it is seen that it is not difficult to substantially increase the plasma density through injection of ionized gas from a rocket or satellite (or, conceivable, a gun). One Kgm mole of ionized gas (2.2 pounds of hydrogen) would give $6.10^{26}$ electrons and ions, and could increase the plasma density by 10 per cc over a volume of $6.10^{25}$ cm$^3$. As another example, the flux tube content could be increased by $6.10^{12}$ per cm$^2$ over an area in the ionosphere 10 Km wide in longitude and 10° in latitude. The 10° latitude from 60° to 70° magnetic maps along field line to the range 4 to 8.5 earth radii in the equatorial plane and covers the distance at which most of the energy in the radiation belts is normally found. Since the energetic trapped particles drift in longitude (electrons eastward and ions westward to form a ring current) all of the particles cross a single longitude once per drift orbit around the earth. The drift period it typically 0.5 – 3 hours. Thus if the energy threshold for stable trapping were greatly reduced at one longitude by cold plasma (ionized gas) injection, the energetic particles would be removed as they reached this longitude in their drift around the earth. Most of the energy in the radiation belt particles could then be removed on a time scale of a drift period, i.e. a few hours. Further, since the energy input into the radiation belts would not be significantly affected, if essentially all of the energy were precipitated in one localized region, this would eliminate (or substantially decrease) percipitation of these particles at other locations, i.e., to some extent both the time and the location at which energetic particles precipitate can be controlled through plasma injection, as well as the energy of the precipitating particles. The average energy input of energetic particles into the atmosphere is about $10^{10}$ – $10^{11}$ Watts. For use as a radio transmitter, in controlling the energy, one would also control the generation of wave energy at very low and extremely low frequencies, with the radiated wave energies of the order of 1000 to 10,000 megawatts. The optimum plasma densities can be readily calculated if the particle energies and magnetic field strength are measured.

EFFECTS ASSOCIATED WITH PRECIPITATION

Several effects are associated with the precipitation process. The precipitation of energetic protons leads to some luminosity (stable auroral red arcs or SAR-arcs) and heating of the ionosphere and thermosphere, and is associated with disruptions of radio communications which use radio reflection from the ionosphere. Following a major magnetic storm, energetic protons are found in large numbers at distances as small as two earth radii in the equatorial plane, and consequently cause disruptions in radio communications at middle latitudes as they precipitate. These effects can persist as long as a week (which is the time required to increase the equatorial plasma density, N, to its pre-storm value by evaporization of ionization out from the ionosphere.) Heatng can, in turn, lead to changes in the high-altitude circulation as the heated regions expand and this gives rise to high-altitude winds. Also, the precipitation process is associated with emission of very large amounts of radio waves at frequencies of the order of 1 Hz, in and near the magnetic equatorial plane.

Electron precipitation also has several associated effects. The precipitation process gives generation of very low frequency radio emission at frequencies of the order of 1 kHz, and the precipitation causes excitation of atmospheric constituents and hence visible aurora.

Thus, the cold plasma injection as disclosed herein and originally claimed in applicant's abandoned application Ser. No. 174,047 can serve as a radio transmitter in the megawatt range.

The more energetic electrons (a few tens of kV) produce substantial amounts of ionization by impact with atoms and molecules in the height range about 80–90 km. This ionization causes absorption of radio waves and hence communication blackouts.

Lower energies (a few kV) ionize particles at higher altitudes (about 100 – 120 km) and irregularities in this ionization can lead to scatter of radio waves and hence enhance radio propagation via radio-scatter circuits. Ionization in this altitude range markedly effects the conductivity of the ionosphere and hence the electric fields and the large-scale dynamic motion of the magnetosphere (the outermost ionized atmosphere). Modifying the conductivity would also change the electric currents flowing in the ionosphere and hence produce magnetic perturbations at and below the surface of the earth. Most of the electron energy is deposited eventually as head in the upper atmosphere, with consequences for atmospheric circulation similar to those for protons.

In radio-wave communications systems in which radio waves pass into or through the ionosphere, the waves are affected by propagation conditions in the ionosphere. These in turn particularly at high latitudes are influenced by energetic particle precipitation.

This precipitation produces ionization which has three principal effects. Ionization produced at low altitudes (generally less than 100 km) contributes to absorption of radio waves which in turn can lead to radio-wave blackouts. Overall increases in ionization density can increase the frequencies at which radio waves are reflected from the ionosphere and thus increase the communication capability of paths using the ionosphere as a reflector. Thirdly, irregularities in ionization are produced. These have two effects; they generally lead to increased radio wave scatter on VHF and UHF circuits, and hence to improved communications on forward-scatter circuits. These irregularities also lead to enhanced fading of signals transmitted through the ionosphere, e.g., from a synchronous satellite, leading to signal dropout and other undesirable features.

In accordance with this invention all of these may be controlled if it is possible to influence the production of ionization by influencing the precipitation of energetic particles from the radiation belts into the ionosphere, and particularly if there is some control over the energy of the precipitating particles, and hence the height in the atmosphere at which most of their energy is deposited.

Energetic particle precipitation into the atmosphere may be influenced by injection of ionized gas (plasma) into the radiation belts at large distances from the earth. The injection of plasma increases the plasma density and thus improves or make possible propagation of elctrostatic and/or electromagnetic waves at frequencies of the order of the electron and ion cyclotron frequencies. These waves may then be amplified by the energetic particles of the radiation belts so that large amplitude waves are produced. The large amplitude waves scatter the energetic particles in energy and velocity and scatter some particles into trajectories which lead to the neutral atmosphere near the earth. These particles then "precipitate" into the atmosphere producing ionization as noted above.

There are three distinct ways of producing the necessary cold (i.e., low energy) ionized gas. The first (shown in the drawing) is to carry in a rocket, satellite or gun projectile some ionizable material. This could be ionized by any of several techniques (electric discharge, or heat, for example) and then released. Alternately, material which is readily ionized in sunlight (such as Barium vapor) could be released into sunlit regions.

The third technique uses photoelectrons emitted from the sunlit surface of the projectile or satellite. The object naturally accumulates a large flux of energetic electrons (typically about $10^9$ per $cm^2$ of collecting area). Since the net charge on the satellite can change by only very small amounts, the number of photoelectrons released is essentially equal at all times to the number of energetic electrons collected. The photoelectrons have energies of about 1 eV copared with $10^2$ to $10^4$ for the energetic electrons. Thus the photoelectron velocity is much less than the energetic electrons. It takes longer to drift away from the satellite or rocket and therefore there is an increase of electron density near the satellite. Some experimentation would be required to determine how large a satellite would be required. The rate at which photoelectrons are emitted is essentially the flux of energetic electrons per unit area multiplied by the collecting area of the satellite. If the satellite is in the shadow of the earth, it will not emit photoelectrons, but the same number of low energy electrons could then be released by an electron gun, thermionic cathode or other controllable electron emitter.

The location and time of enhancements in ionization in the ionosphere could be partially controlled by cold plasma injection controlling energetic particle precipitation. The energy of the particles and hence the altitude of the ionization produced are also subject to some control. The specific application would depend on the use to which the ionization was to be put.

Injection of low plasma densities precipitate higher energy particles which penetrate to greater depths in the atmosphere. The more energetic electrons produce absorption of radio waves. Lower energy electrons loead to E-region ionization (100-130Km) which scatters radio waves. Forward scatter can be used for communications. Back scatter produces clutter (interference) on radar systems.

The particular application will clearly depend on the effect required. For example, to produce radar clutter in a location or radar forward scatter communication circuits, enough plasma would be injected into the magnetically connected region over the equator to produce precipitation of particles at energies of a few kV. To produce radio-wave absorption, lower plasma densitites would be injected to cause precipitation of electrons of energies of a few tens of kV.

To remove radar clutter, over a location, the plasma would be injected over a region to the West, to precipitate the electrons at energies of a few kV to the west of the chosen location. The electrons drifting eastward would then be precipitated before they reached the region desired to be free of clutter. To maximize radio-scatter communication, the electrons of energies of several tens of kV would be precipitated to the West by injection of modest densities of plasma. Larger plasma densities would be injected on magnetic field lines over the communication region. This would produce the irregularities for enhanced scatter, with the bulk of the radiowave absorption removed.

While the invention has been particularly shown and described with reference to the preferred embodiment thereof, it will be understood by those skilled in the art that the various changes in form and details may be made therein without departing from the scope and spirit of the invention.

What is claimed is:

1. The method of controlling a radio wave communication system in a high latitude ionospheric medium which comprises placing a source of cold plasma into the magnetospheric medium, and injecting said cold plasma from said source into the magnetospheric medium at a time including prior to the initiation of said radio wave communication in said ionosphere to form a substantially non-reflective radio wave ionospheric medium.

2. In a high latitude radio ionospheric communication system, a source of cold plasma, means placing said source into the magnetospheric medium outside the earth's atmosphere and means for injecting a cold plasma into the magnetospheric medium at a time prior to the initiation of said radio wave communication to form a radio wave transmissive path in said medium.

3. Apparatus for controlling high latitude communications and radio wave surveillance systems which comprises means for modifying the high latitude medium in which said systems are operated, including means for injecting a cold plasma into a selected portion of the magnetosphere and means for transporting said cold plasma injection means to said portion, said means for injecting cold plasma being adapted to inject in sufficient quantities and into a portion of the magnetosphere to form a radio wave transmissive path in said medium.

4. The invention defined in claim 3 wherein said selected region is in the outer radiation belt and in the magnetically connected region over the equator.

5. The invention defined in claim 4 wherein cold plasma is injected in sufficient quantities to produce precipitation of particles at energies of a few thousand volts.

6. The invention defined in claim 4 wherein the cold plasma injection is that quantity required to cause precipitation of electron of energies of a few of thousands of volts.

7. The invention defined in claim 4 wherein the plasma is injected over a region to precipitate the electrons at energies of a few thousands volts and to the West of the chosen location to produce a region free of radar clutter.

8. The invention defined in claim 4 wherein the density of plasma injection is sufficient to cause electrons of energies of several thousand volts to be precipitated to the West of the injection site.

9. The invention defined in claim 4 wherein the cold plasma injection is on magnetic field lines over the communication region.

10. A radio transmitter in which the radiated energy is of the order of $10^6$ watts or more, including as a part thereof a portion of the earth's magnetosphere and including cold plasma injection for causing an enhanced wave amplification from within said portion.

11. A radio wave amplifier comprising in combination, a portion of the earth's magnetosphere,
   means for introducing a radio wave to be amplified into said portion, and
   cold plasma injection means for injecting a cold plasma into said portion sufficient to cause an enhanced wave amplification from said portion.

12. A method of transmitting a radio wave which comprises
   introducing the radio wave to be amplified into a portion of the earth's magnetosphere and
   introducing a cold plasma into said magnetosphere and of sufficient quantity to cause increased wave emission from said magnetosphere.

13. The invention in claim 12 wherein said cold plasma is a gas or vapor selected from the group including barium, and hydrogen.

* * * * *